United States Patent [19]

Sietsess et al.

[11] Patent Number: 4,770,939

[45] Date of Patent: Sep. 13, 1988

[54] PVDF-BASED POWDER COATINGS

[75] Inventors: Willem Sietses, Uithoorn; Tjalling M. Plantenga, Vreeland, both of Netherlands; Jean-Paul Dekerk, Heverlee, Belgium

[73] Assignee: Labofina, S.A., Brussels, Belgium

[21] Appl. No.: 89,882

[22] Filed: Aug. 27, 1987

[30] Foreign Application Priority Data

Sep. 1, 1986 [GB] United Kingdom ................. 8621109

[51] Int. Cl.$^4$ ........................... C08K 3/00; B05D 3/02; B32B 5/16
[52] U.S. Cl. .................................... 428/402; 427/195; 427/221; 428/407; 428/413; 428/421; 524/407; 524/413; 524/447; 524/520
[58] Field of Search ................. 427/195, 221; 524/520, 524/307, 413, 407, 447; 428/402, 407, 413, 421

[56] References Cited

U.S. PATENT DOCUMENTS

| 3,324,069 | 6/1967 | Koblitz et al. | 524/520 |
|---|---|---|---|
| 3,944,689 | 3/1976 | Luckock et al. | 427/391 |
| 4,065,438 | 12/1977 | Verborgt. | |
| 4,179,542 | 12/1979 | Christofas et al. | 428/328 |
| 4,291,112 | 9/1981 | Lv | 427/218 |
| 4,563,393 | 1/1986 | Kitagawa et al. | 428/421 |
| 4,687,801 | 8/1987 | Mitani et al. | 524/520 |

FOREIGN PATENT DOCUMENTS 1293650 10/1972 United Kingdom .
1509404 5/1978 United Kingdom .

Primary Examiner—Herbert J. Lilling
Attorney, Agent, or Firm—Mark A. Montgomery; John K. Abokhair; M. Norwood Cheairs

[57] ABSTRACT

A process for preparing pigmented PVdF-based powder coating products is disclosed, which comprises the steps of (i) mixing PVdF resin with a compatible thermoplastic resin, preferably PMMA in a weight ratio of about 80:20 to 40:60, with pigments, and with a small amount of flow promoter, (ii) pelletizing the mixture of (i), and (iii) cryogenically grinding the pellets and sieving the large particles. Also disclosed is a process for coating a substrate, comprising the steps of (a) applying the above prepared powder coating product on a substrate, and (b) subjecting to a heat treatment.

18 Claims, No Drawings

PVDF-BASED POWDER COATINGS

FIELD OF THE INVENTION

The present invention relates to a process for preparing pigmented powder coating products, based on poly(vinylidene fluoride) hereinafter referred to as PVdF, and to a process for coating a substrate with a pigmented PVdF coating. In particular, the present invention relates to a process for obtaining pigmented PVdF-based coatings without using solvents, more particularly for obtaining pigmented PVdF-based protective coatings.

BACKGROUND

PVdF-based coatings are known to be very useful as protective coatings for a variety of substrates. These coatings are thermally stable and are resistant to weathering and chemical degradation.

The general technique used for preparing PVdF-based coatings entails; preparing a dispersion of PVdF in a suitable solvent, applying this dispersion by conventional means onto the required substrate, then subjecting this substrate to heat treatment. The solvent used in the dispersion is generally known in the art as "latent solvent", and is described as an organic solvent which has no significant action on PVdF at room temperature but which at an elevated temperature exerts a sufficient solvent action.

Although the known systems may give good results, environmental protection laws throughout the world, but mainly in the U.S.A. and Europe, are making it increasingly difficult to handle solvent-based coating systems. Further, the recovery of the solvent is a costly procedure. Accordingly, there is a significant need for solventless PVdF-based coatings.

It is also known in the art to obtain pigmented PVdF-based coatings from a mixture of powdered pigment and PVdF. However, such a mixture is hardly homogeneous. Further, the pigment is not perfectly wetted by the resin, and the coatings obtained have no long term stability (believed to be due to the presence of voids around the pigment particles). Also, the mechanical properties of such coatings are rather bad. Accordingly, there is a significant need in the art for an improved solventless process for obtaining pigmented PVdF-based coatings.

OBJECTS OF THE INVENTION

It is an object of the present invention to provide pigmented PVdF-based powder coating products.

It is another object of the present invention to provide a process of preparing pigmented PVdF-based powder coating products without the use of solvents.

It is yet another object of the present invention to provide stable pigmented PVdF-based coatings without the use of solvents and the process of preparing such.

SUMMARY OF THE INVENTION

Accordingly the present invention provides a process for preparing pigmented PVdF-based powder coating products, comprising the steps of:

(i) mixing PVdF resin with at least one compatible thermoplastic resin and at least one pigment;
(ii) pelletizing the resulting mixture of (i);
(iii) cryogenically grinding the resulting pellets, and seiving out the larger particles.

The present invention further provides a coated substrate and a process for coating a substrate with a pigmented PVdF-based coating. The process comprises the steps of:

(a) applying the pigmented PVdF-based powder on a substrate; and
(b) subjecting the coating to a heat treatment, preferably at a temperature of about 180° to 260°.

According to a preferred embodiment of this invention, the pigmented PVdF-based powder is applied on a substrate which has been previously covered with a primer coating, such as an epoxy-type resin.

DETAILED DESCRIPTION OF THE INVENTION

The following description is to further illustrate the invention but should not be considered limitative of the reasonable scope thereof.

The term PVdF used herein refers not only to the homopolymer of vinylidene fluoride, but also to the copolymers prepared from at least 90% by weight of vinylidene fluoride monomers. Suitable copolymers include those with fluorinated comonomers such as, for example, tetrafluoroethylene, hexafluoropropylene, vinylfluoride, and the like. However, the hompolymer is generally used.

The preferred PVdF resins are those having a molecular weight in the range of about 10,000 to 70,000, most preferably about 30,000 to 50,000, a melting temperature of about 165° to 170° C., a melt flow index (according to ASTM D 1238) of about 10 to 50 g/10 min, most preferably about 10 to 30 g/10 min, and a melt viscosity (according to ASTM D 3835) of about 6,000 to 12,000 Poise (P) at 230° C., most preferably about 7,000 to 10,000 P. Coatings made from PVdF resins with molecular weights lower than about 10,000 have poorer mechanical properties. On the other hand, powders made from PVdF resins having a molecular weight greater than about 70,000 remain excessively viscous during the heat treatment.

The PVdF resin is mixed with one or several compatible thermoplastic resins. It has however been found that it is most advantageous to use a thermoplastic poly(methylmethacrylate), hereinafter referred to as PMMA. The thermoplastic PMMA resin can be a homopolymer, or a copolymer obtained by (co)polymerization of at least about 75 wt % of an alkyl methacrylate, the other comonomers being one or several olefinically unsaturated comonomers, preferably of the alkyl(meth)acrylate type. The esters are formed by the reaction of the acrylic or methacrylic acid with suitable alcohols, for example, methyl alcohol, ethyl alcohol, propyl alcohol, butyl alcohol and 2-ethylhexyl alcohol. Generally, the larger the alcohol portion of the ester, the softer and more flexible the resultant resin. Also, generally, the methacrylic esters form harder films than the corresponding acrylic esters. Examples of such resins include, for example, polymethylmethacrylate, copolymers of methylmethacrylate with ethyl acrylate, butyl methacrylate, isobutyl methacrylate, acrylic acid or methacrylic acid, and the like. The most preferred PMMA resins are those which exhibit a viscosity of about 7 to 17 P in 40% solution in which the solvent is a 95:5 by weight mixture of toluene and ethylene glycol methyl ether.

The amount of the compatible thermoplastic resin mixed with the PVdF resin is an amount sufficient to improve the stability of the resuling coating. When a PMMA resin is used the weight ratio of PVdF/PMMA preferably varies from about 80:20 to 40:60, more preferably from 75:25 to 65:35.

The mixture of PVdF resin with the at least one thermoplastic resin and the at least one pigment can additionally contain a flow promoting agent. Although a flow promoting agent is not essential to the invention, it helps obtain the high quality of coating surface required in the art. The flow promoting agents that are preferably used in the mixture of the present invention are acrylic resins having a relatively low molecular weight (e.g. of about 20,000). The amount of flow promoting agent can vary widely from about 0 to 3 wt % based on the total weight of the mixture, but the amount preferably used is of about 1 wt % based on the total weight of the mixture.

The use of pigments in the coating composition of the present invention is essential. If no pigment is used the resulting coating is unevenly milky and an undesirable clearcoat or varnish is obtained. Further, such clearcoats do not have as much resistance to high temperature, and most importantly they do not sufficiently absorb ultraviolet light which degrades the primer.

When pigments are used, any pigment or combination of pigments can be used provided they are resistant to the subsequent heat treatments. The type of pigments used in the coating composition of the present invention can be selected in accordance with the type of pigments known to be useful for PVdF-based wet coatings. The amount of pigment used can vary widely, depending particularly upon its hiding power; for example, a white topcoat prepared exclusively with titanium dioxide may require about 35 wt % of said pigment. Other pigments with better hiding properties may generally require lower amounts.

The extruding and granulating (pelletizing) of the resulting mixture above can be conducted following standard procedures. The operating procedures and conditions are easily determined by one skilled in that art. In particular, a single or double screw extruder can be used. The processing temperature is preferably from about 190° C. to 240° C. with about 220° C. being most preferred. The dimensions of the pellets are not critical parameters, however the pellets are usually about 3 mm in diameter and 2 mm in length.

Cryogenically grinding the pellets may be accomplished by any means which allows suitable particles to be obtained. The resulting powder should comprise particles of size and shape suitable for achieving constant flow through the application equipment, mainly in order to obtain a constant thickness of the coating. It is preferred that the shape of the particles be as spherical as possible, because the resulting powder has better flowing properties. Regarding the size of the particles, the grinding step is, if needed, associated with a sieving step for eliminating the largest size particles, i.e. those particles exceeding about three times the desired thickness of the coating. On the other hand, excessively small particles (i.e. <1.5 um wherein um stands for micrometer) are to be avoided, because they are a health hazard and tend to block the transport lines during application. Accordingly it is preferred that the particles of the ground PVdF-based powder have an average particle size between about 0.03 and 0.05 mm.

The grinding step is usually carried out at a temperature no higher than about −50° C. Compositions containing low amounts of PVdF should be ground at lower temperatures, i.e. below about −60° C. In any case, the pellets are preferably cooled, usually in liquid nitrogen, immediately before grinding.

It is envisioned according to the present invention that a particularly useful grinding process would be any process of grinding that includes the removal of ground particles below a predetermined size (to avoid overgrinding) and the retention of larger particles for further grinding.

The applicants have unexpectedly found that it is preferable to use a hammer mill wherein a rotating shaft carries hammers which break the pellets upon fixed shapes in the casing of the hammer mill and hammer them through a sieving lining at the bottom of the hammer mill. Sieve openings of about 0.2 mm have been found particularly appropriate.

The sieving step is only needed to keep the larger particles in the hammer mill until they are ground small enough to fit through the sieve. Sieving may not be necessary if another means is used to grind the pellets to a fairly uniform small size.

The resulting powder can be applied on the substrate by any means suitable for achieving an even distribution of the particles. In particular, the powder can be applied by any electrostatic spray application apparatus, whereby the charged particles are sprayed onto the oppositely charged substrate. Alternative application techniques include, for example cloud chamber, fluidised bed, and even in some cases triboelectric coating, and the like. Such techniques are well known in the art and need not be described further.

The PVdF-based powder can be applied directly onto the substrate, but is preferably applied over a suitable primer coating. In particular, the PVdF-based powder is preferably applied over primer coatings based on epoxy-type resins, more particularly on epoxy-phenolic resins, which are known in the art as primers for similar fluorinated polymers. It is also possible to apply the PVdF-based powder over primer coatings based on epoxy-type resins which contain from about 5 to 20 wt % PVdF resin powder.

After the PVdF-based coating has been applied to the substrate, it must be subjected to a heat treatment at a temperature sufficient to melt at least a portion of the PVdF-based powder. The heat treatment preferably comprises passing the coated substrate into a heated oven wherein the coating is finally baked at a temperature from about 180° C. to 260° C. The temperature used in this step should be higher than the crystalline melting point of the PVdF-based powder, which melting point is easily determined experimentally. On the other hand, excessively high temperatures have a yellowing effect on the finished coating. The duration of the heating step is determined by any suitable method which is known in the art, taking into account that an insufficient duration is detrimental to the surface hardness.

Finally, the coating and its substrate can be cooled by any suitable means, but preferably either slowly cooled in air or quenched in water.

In order to further illustrate the invention, the following examples are given which are intended not to limit the scope of the invention.

EXAMPLE 1

A mixture was prepared from the following components:

46.2 Parts by weight (p.b.w.) of a commercially available PVdF resin (from Pennwalt and Atochem) having a molecular weight* of about 45,000, a melt flow index (according to ASTM D 1238) of about 20 g/10 min, and a melt viscosity (according to ASTM D 3835) of about 9,000 P at 230° C.;

19.8 p.b.w. of a commercially available thermoplastic methylmethacrylate polymer (from Rohm and Haas and Polyvinylchemie) having a viscosity of about 12 P in 40% solution in which the solvent is a 95:5 by weight mixture of toluene and ethylene glycol methyl ether;

1 p.b.w. of an acrylic polymer (as flow improver) prepared from 30 wt % of ethylacrylate and 70 wt % of 2-ethylhexylacrylate and having a viscosity of about 1.06 Pa.s at 98.9° C., or of about 590 Poises (97.6% solution in xylene); and 33 p.b.w. of a white $TiO_2$ pigment, commercially available as Titanium white KRONOS-2160 from Kronos Titan, having a density of 3.9 g/cm$^3$, and containing 90% $TiO_2$. This pigment is prepared according to the chlorine process and is surface-treated with alumina and silica compounds to increase its weathering resistance.

*The molecular weights used herein are weight average molecular weights determined by gel permeation chromatography.

The resulting mixture was extruded under the following conditions, giving pellets of 3 mm in diameter and about 2 mm in length:

twin screw extruder
screw rotation: 200 rpm
load: 85%
temperature profile: 170° C. at hopper exit, rising to 220° C. in the middle of the screw, then down to 190° C. at the end of the screw
temperature of the material at the exit: 195° C.

The pellets were cooled in liquid nitrogen down to at least about −150° C. or lower then ground at a temperature no higher than about −50° C. in a hammer mill and sieved to eliminate particles larger than about 150 um. In the hammer mill, a rotating shaft carries hammers which break the pellets on fixed shapes in the casing of the hammer mill and hammer them through a sieving lining at the bottom of the hammer mill. The particle size distribution was measured: 99% of the particles had a size below 90 um, and 40% below 32 um. Only 5% had a size below 15 um.

The resulting powder was applied by an electrostatic spray process on a 2 mm thick chromated aluminum plate previously covered by a 5 um layer of an epoxy primer. The epoxy primer had the following composition:

20 p.b.w. of commercially available epoxy resin (obtained from Shell) having a molecular weight of about 6750 and an epoxy equivalent of about 3200,
50 p.b.w. of solvent (diacetone alcohol and solvesso—100 from Essochem),
20 p.b.w. of a mixture of extender (China Clay) and pigment (titanium dioxide and strontium chromate),
2 p.b.w. of thixotropic agent (bentonite),
2 p.b.w. of hardener (urea-formaldehyde), and
0.1 p.b.w. of catalyst (paratoluenesulfonic acid).

The coated substrate was then heated 9 minutes at 240° C. (object temperature), giving a 50 um PVdF-based top coating.

The properties of the coating were determined:

| | | |
|---|---|---|
| Erichsen | 7 mm | according to ISO-1520, DIN-53156 or ECCA-T6 |
| Direct impact resistance | 100 kg · cm | |
| Reverse impact resistance | 50 kg · cm | both impact resistances measured according to ECCA-T5 or ASTM-D 2794 |
| Buchholz hardness | 90 | according to ISO-2815 or DIN 53153 (-ECCA-T12) |
| Adherence | GT0 | according to ISO-2409 |
| Solvent resistance | >100 rubs | using methyl ethyl ketone (MEK) as solvent |
| Humidity cabinet | >2000 h | according to ASTM-D2247-68 (at 40° C. and 100% humidity, no delamination observed) |
| Q-UV test | | according to ECCA-T10 |
| | 100% | gloss retention after 2000 h. |
| | 80% | gloss retention after 4000 h. |

Comparative example A

A PVdF-based composition containing solvents was prepared by mixing the following ingredients:

20 p.b.w. of a commercially available highly crystalline, high molecular weight PVdF resin, having a molecular weight of about 350,000 and a melt viscosity (according to ASTM D 3835) of about 31,000 P,
20 p.b.w. of thermoplastic PMMA (as described in Example 1),
10 p.b.w. of dimethylphthalate,
20 p.b.w. of $TiO_2$ pigment,
3 p.b.w. of a mixture of additives-a levelling agent (polymekon wax) and a flow improver (Neboflow from Sigma Coatings),
30 p.b.w. of solvent (isophorone, ethylglycol acetate, butylglycol).

The resulting solution was sprayed on a 2 mm thick chromated aluminum plate previously covered by a 5 mm layer of an epoxy primer (as described in Example 1). The coated substrate was then heated 1 minute at 245° C., giving a 30 um PVdF-based top coating.

The following properties were determined as in Example 1:

| | |
|---|---|
| Erichsen | 6 mm |
| Reverse impact resistance | 150 kg · cm |
| Buchholz hardness | 100 |
| Adherence | GT0 |
| Solvent resistance | >100 rubs |
| Humidity cabinet | >2000 h without delamination |
| Q-UV test | 85% gloss retention after 2000 h |

Comparative example B

The pellets obtained in Example 1 were cryogenically ground in a laboratory scale needle mill (ALPINE, type 100 1U). The particle size distribution was as follows: 34% below or equal to 32 um; 16% equal to or above 90 um. No satisfactory coating was obtained using this powder.

Comparative example C

A polyester powder coating was prepared according to the procedure described in U.S. Pat. No. 4,065,438, more specifically according to Example 1 thereof.

The following properties were determined as in Example 1 of the present invention:

| | |
|---|---|
| Erichsen | 8.5 mm |
| Direct impact resistance | 200 kg · cm |
| Reverse impact resistance | 50 kg · cm |
| Buchholz hardness | 90 |
| Adherance | GTO |
| Solvent resistance | 3 rubs |
| Humidity cabinet | >1000 h without delamination |
| Q-UV test | 40% gloss retention after 500 h |

EXAMPLE 2

The same powder as obtained in Example 1 was electrostatically sprayed directly into a 2 mm thick thermic galvanized steel plate previously covered by a 5 um layer of an epoxy primer as described in Example 1. The coated substrate was heated 9 minutes at 240° C., whereby a 50 um PVdF-based top coating was obtained.

The properties determined were very similar to those determined in Example 1.

EXAMPLES 3–8 AND COMPARATIVE EXAMPLE D

PVdF-based coatings were prepared, as in Examples 1 and 2 using the same PVdF, PMMA, and flow improver, in varying amounts to form different mixture compositions as mentioned in the following Table (all pigment names are Trade Names).

TABLE
(all values p.b.w.)

| | Ex. 3 | Ex. 4 | Ex. 5 | Ex. 6 | Ex. 7 | Ex. 8 | Comp. Ex. D |
|---|---|---|---|---|---|---|---|
| Color | white | brown | brown | beige | grey | brown | brown |
| PVdF | 44.8 | 63.3 | 44.5 | 53.8 | 55.9 | 58.1 | 26.7 |
| PMMA | 19.2 | 26.7 | 44.5 | 23.1 | 24.0 | 24.0 | 62.3 |
| flow improver | 1.0 | 1.0 | 1.0 | 1.0* | 1.0 | 1.0* | 1.0 |
| TiO$_2$ Kronos 2160(a) | 35.0 | 0.45 | 0.45 | 20.2 | 16.4 | | 0.45 |
| Yellow AC 5047(b) | | 3.65 | 3.65 | | | 3.45 | 3.65 |
| Red 180(b) | | 4.90 | 4.90 | | | | 4.90 |
| Flammrus 101(c) | | 1.00 | 1.00 | 0.01 | 0.13 | 0.0 | 1.00 |
| Sicotans Yellow L2100(d) | | | | 1.83 | 2.67 | | |
| Monastral Green(e) | | | | | 0.002 | | |
| Lankowax TF 1778(f) | | | | | | 1.0 | |
| Plastorit(g) | | | | | | 10.0 | |
| Bayferrox 130 BM(b) | | | | | | 0.92 | |
| Properties | | | | | | | |
| Erichsen (mm) | 6.7 | >8 | >8 | >8 | >8 | >8 | >8 |
| Conical mandrel | 22 | 0 | 69 | 10 | 0 | 10 | 69 |
| Impact | 100 | 100 | 10 | 100 | 100 | 100 | 6 |
| QUV test (1500 h) | 100% | 100% | 100% | 100% | 100% | 100% | 92% |
| Buchholz hardness | 97 | 102 | 79 | 98 | 93 | 97 | 75 |

*In example 6 and 8, the flow improver was a commercial powder form aid, available as Modaflow Powder III (Modaflow is a registered Trade Mark of Monsanto). Note, some of the compounds above were obtained from the following companies: (a) from KronosTitan, (b) from Bayer, (c) from Degussa, (d) from BASF, (e) from ICI, (f) from Lanco, and (g) from Naintsch.

EXAMPLES 9 AND 10

Two identical lots of pellets, prepared according to Example 1, were ground in the same hammer mill according to the procedure described in Example 1. However the sieve had openings of 0.5 mm (Example 9) and 0.3 mm (Example 10).

The particle size distribution was as follows:

| | | Ex. 9 | Ex. 10 |
|---|---|---|---|
| | <50 um | 39% | 67% |
| >50 um | <100 um | 45.5% | 29.5% |
| >100 um | <150 um | 12.5% | 2.0% |
| >150 um | | 3.0% | 1.5% |

The coatings (produced according to Example 1) were smoother when using the powder of Example 10.

These examples show that pigmented PVdF-based coatings prepared according to the solvent free process of the present invention have improved long term stability and good mechanical properties when compared to pigmented PVdF-based coatings prepared by known solvent free processes.

We claim:

1. A process for preparing pigmented PVdF-based powder coating products, comprising the steps of:
   (i) mixing PVdF resin with at least one compatible thermoplastic PMMA resin, a minor amount of a low molecular weight acrylic polymer as a flow improver, and a minor amount of at least one pigment, wherein the weight ratio of PVdF-PMMA is from about 80-20 to 40-60;
   (ii) pelletizing the resulting mixture of (i);
   (iii) grinding, at a temperature below about −50° C., the resulting pellets of (ii) to form a particulate powder having an average particle size between about 0.03 and 0.05 mm.

2. The process according to claim 1 wherein the PVdF resin has a molecular weight of about 10,000 to 70,000, the PMMA resin exhibits of visocity of about 7 to 70 P; and the acrylic resin has a molecular weight of about 20,000 and is present in the amount of about 1 weight % based on the total weight of the mixture.

3. A pigmented PVdF-based powder coating product prepared according to the process of claim 1.

4. The process according to claim 1 wherein the PVdF resin has a molecular weight of about 10,000 to 70,000.

5. The process according to claim 4 wherein the PVdF resin has a molecular weight of about 30,000 to 50,000.

6. The process according to claim 1 wherein the thermoplastic PMMA resin exhibits a viscosity of about 7 to 17 P in 40% solution in which the solvent is a 95:5 by weight mixture of toluene and ethylene glycol methyl ether.

7. The process according to claim 1 wherein the weight ratio of PVdF/PMMA is from 75:25 to 65:35.

8. The process according to claim 1 wherein said flow promoting agent admixed in said step (i) is an acrylic resin having a relatively low molecular weight and is present in a concentration of about 1 weight %.

9. The process according to claim 8 wherein said acrylic resin is made from ethylacrylate and 2-ethylhexylacrylate and has a molecular weight of about 20,000.

10. The process according to claim 1 wherein the grinding step of (iii) is conducted in a hammer mill in which a rotating shaft carries hammers that break the pellets into small particles on fixed shapes in the casing of the hammer mill and then hammer the small particles through a sieving lining at the bottom of the hammer mill.

11. The process according to claim 10 wherein the sieving lining has sieve openings of about 0.2 mm.

12. The process according to claim 1 wherein the pigment is titanium dioxide.

13. The process according to claim 12 wherein the titanium dioxide is in a concentration of at least about 35 weight %.

14. The process according to claim 1 wherein the pelletizing is conducted by melt extruding and granulating the mixture of (i).

15. A process for coating a substrate with a pigmented PVdF-based coating comprising the steps of:
  (a) applying on a substrate a powder which has been prepared according to the process of claim 1;
  (b) subjecting the applied powder of (a) to a heat treatment at a temperature between about 180° to 260° C. thereby melting the powder; and
  (c) cooling the melted powder of (b) to form a stable pigmented PVdF-based coating on said substrate.

16. The process according to claim 15 wherein the substrate of step (a) has been previously covered with an epoxy-type resin primer coating.

17. An article of manufacture produced according to the process of claim 16.

18. The process according to claim 15 wherein the heat treatment is carried out at a temperature of about 180° to 260° C.

* * * * *